US008800437B2

(12) United States Patent
Pontabry et al.

(10) Patent No.: US 8,800,437 B2

(45) Date of Patent: Aug. 12, 2014

(54) ELECTRIC COOKING APPLIANCE WITH A PIVOTING COVER WITH A CONDENSATE RECOVERY MECHANISM

(75) Inventors: Florent Pontabry, Shaoxing (CN); Frédéric Seurat, Bretigny (FR)

(73) Assignee: SEB S.A., Ecully (FR)

(*) Notice: Subject to any disclaimer, the term of this patent is extended or adjusted under 35 U.S.C. 154(b) by 113 days.

(21) Appl. No.: 13/252,222

(22) Filed: Oct. 4, 2011

(65) Prior Publication Data

US 2012/0079949 A1 Apr. 5, 2012

(30) Foreign Application Priority Data

Oct. 4, 2010 (FR) ..................................... 10 58033

(51) Int. Cl.
*A47J 27/00* (2006.01)

(52) U.S. Cl.
USPC ........................................................... 99/444

(58) Field of Classification Search
USPC .......... 126/1, 1 R, 9 R, 19 R, 20, 21 A, 21 R, 126/25 R, 38, 39 R, 41 R, 190, 198, 211, 126/299 R, 344, 369; 99/324, 325, 331, 339, 99/340, 348, 357, 385, 400, 403, 410, 413, 99/416, 417, 422, 444, 446, 448, 449, 450, 99/467; 219/439, 432–433, 438
See application file for complete search history.

(56) References Cited

U.S. PATENT DOCUMENTS 5,584,234 A * 12/1996 Baillieul et al. ................ 99/403
5,865,101 A * 2/1999 Brown ............................ 99/340
6,105,810 A * 8/2000 Daenen et al. ............. 220/366.1
6,536,333 B2 * 3/2003 Bouly et al. .................... 99/403

FOREIGN PATENT DOCUMENTS

EP 0028190 A1 5/1981
EP 1216641 A1 6/2002
EP 1064872 * 2/2004

* cited by examiner

*Primary Examiner* — Dana Ross
*Assistant Examiner* — Joseph Iskra
(74) *Attorney, Agent, or Firm* — The Webb Law Firm

(57) ABSTRACT

Provided is an electrical cooking appliance with a case (10) forming a cooking container with a vat closed by a pivoting cover (12) mounted on case (10); cover (12) includes a joint (21) forming a spout designed so that joint (21) includes a channel (40) which leads through an initial extremity into the spout and, through a second extremity, to near a condensate reservoir when cover (12) is raised.

7 Claims, 2 Drawing Sheets

22
21
20
26
26
23
12
11
40
27
50
10
13

ELECTRIC COOKING APPLIANCE WITH A PIVOTING COVER WITH A CONDENSATE RECOVERY MECHANISM

BACKGROUND OF THE INVENTION

1. Field of the Invention

This invention covers an electrical cooking appliance with a pivoting cover with a condensate recovery mechanism. More specifically, the invention covers a slow cooker with such a mechanism.

2. Description of the Prior Art

Document EP1216641 describes a cooking appliance, specifically, a deep frier, with a cooking container with a vat closed by an attached pivoting cover. The cover has an internal wall angled toward a channel when the cover is lowered, closing the container. The channel is adjacent to the lower edge of the cover's internal wall when raised and an opening at the lower edge of the internal wall provides a connection to a reservoir. This design requires major modifications to the appliance cover.

SUMMARY OF THE INVENTION

The purpose of the invention is to provide a mechanism to easily remove condensate without requiring major modifications to the appliance.

This goal is achieved using an electrical cooking appliance with a case which forms a cooking container with a vat closed by a pivoting cover mounted on the case; the cover includes a hinge forming a spout designed so that the hinge includes a channel which leads through an initial extremity into the spout and, through a second extremity, to near a condensate reservoir when the cover is raised.

The addition of the condensate evacuation ability to the cover hinge does not require any change to the cover's general structure. In addition, this simplified design allows the condensate to be evacuated quickly, without any additional action by the user.

In other variations of the invention:

the cooking appliance includes channel closing mechanisms when the cover is lowered.

the reservoir may be mounted on the case so that it may be removed.

the closing mechanism includes at least one rib on the case and/or cover at the channel level; the height of the rib(s) is calculated so that, when the cover is lowered, the distance between the rib(s) and the case or cover is less than the inside diameter of the channel.

the hinge and the channel form a single part, the channel is located at the level of the cover hinge, the first extremity of the channel has a flared section, the transverse section of the hinge is generally shaped like a "V", the appliance is a slow cooker.

BRIEF DESCRIPTION OF THE DRAWINGS

Other specifics aspects and benefits of this invention are included in the description below of an implementation method, which is a non-limiting example; it is illustrated by the attached drawings in which.

DETAILED DESCRIPTION OF THE INVENTION

Figure 1:
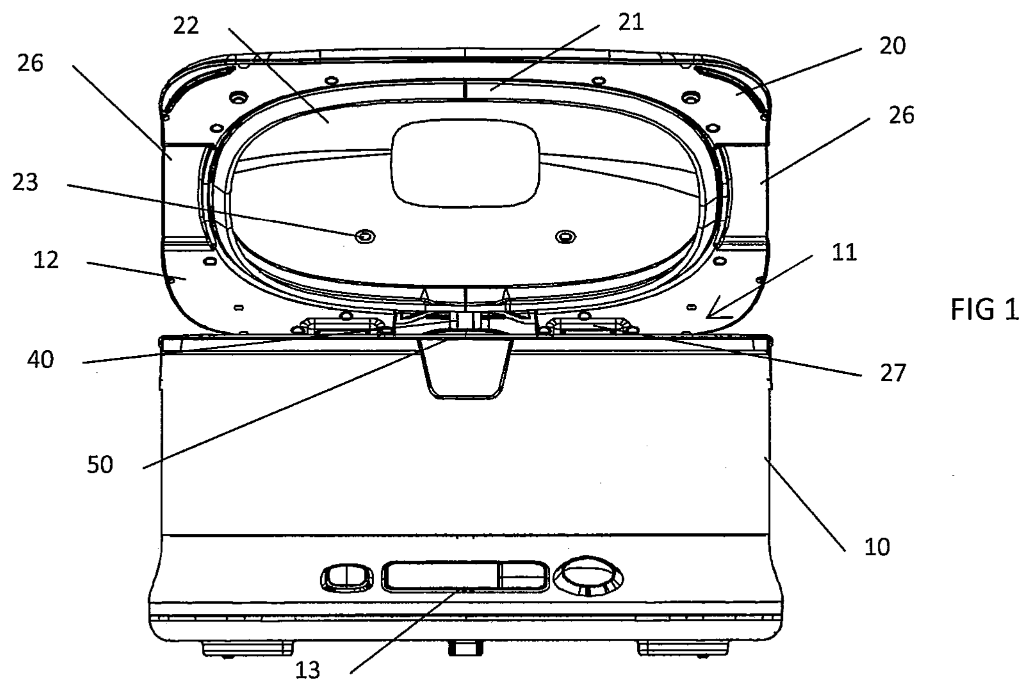
FIGS. 1 and 2 are the front and back views, respectively, of a cooking appliance equipped with a condensate recovery mechanism based on the invention.
Figure 2:
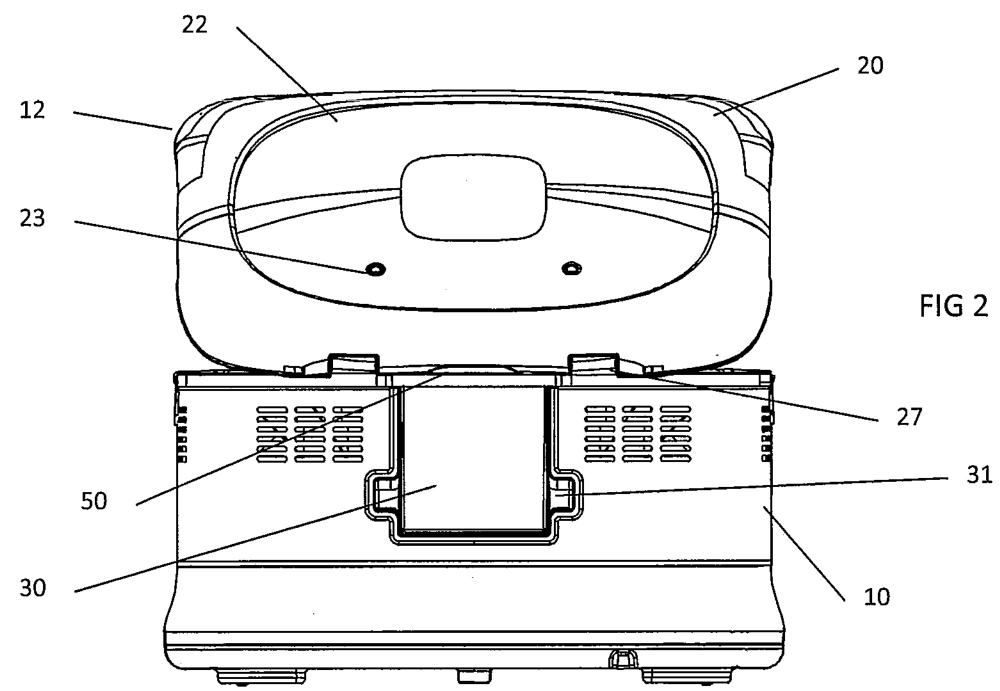

The cooking appliance used to describe this invention is a slow cooker. This appliance is designed to cook slowly and/or to maintain heat at temperatures of less than 100° C. However, the invention may be easily adapted to any other type of electrical cooking appliance from which it is desirable to remove the condensate generated while cooking food.

In accordance with the invention, the electrical cooking appliance includes a main body (10) or a case consisting of a housing in which a vat (11) is inserted to cook the food. The shape of case 10 may be, for example, basically rectangular.

The case has a hinged cover (12) mounted on case 10 so that the upper portion of main body 10 is either opened or closed using cover 12. Case 10 also has a control mechanism (13) which controls the operation of the cooking appliance.

The cooking appliance also includes at least one sensor (not shown) to detect the temperature inside the internal vat. The heating mechanism (not shown) of the cooking appliance includes an external heating element mounted on case 10.

Control mechanism 13 is installed on the front of main body 10. Control mechanism 13 includes standard buttons and/or a screen to allow a user to select the cooking mode. For example, the user may select cooking duration and temperature or select from among pre-programmed cooking programs.

In addition, control mechanism 13 is connected to the heating mechanism to activate or deactivate it depending on the cooking program selected by the user and, in addition, the temperature measured by the sensors.

Case 10 and the cover may be made of plastic.

Depending on the implementation, a resistance heating element may form a heating body around the cooking container.

Cover 12 includes an outside edge (20) and a central section (22) which bulge out. Outside edge 20 is basically flat in order to fit against the upper edge of case 10 when cover 12 is lowered. Central section 22 may, for example, be transparent so that the user can monitor cooking progress. Cover 12 may also include one or more evacuation holes (23) to remove vapor under pressure. In accordance with the implementation shown, holes 23 are located in the central section.

Outside edge 20 of cover 12 may include notches (26) to allow handles (not shown) on internal vat 11 to be fit into cover 12 to close case 10.

Cover 12 includes a hinge (27) which allows the cover to be pivoted on case 10. Hinge 27 is located on the upper edge of case 10, for example, on the back portion of case 10. However, cover hinge 27 may also be installed on either side of case 10.

The cooking appliance also includes a condensate recovery reservoir (30). Reservoir 30 may, for example, be mounted in a housing on case 10 of the appliance. In accordance with the implementation shown, condensate recovery reservoir 30 is removable and positioned basically at the level of the hinge of cover 12. Reservoir 30 is held in place due to sprockets (31) which connect to a notch in case 10 of the appliance. Reservoir 30 also includes a larger opening through which the condensate enters.

In another variation, the reservoir is integrated into the case. In that variation, the reservoir is emptied using a second opening on the lower portion of the reservoir.

Cover 12 also includes, on its internal wall, a hinge (21), which ensures that the seal between cover 12 and case 10 is watertight. In accordance with the implementation shown, hinge 21 is attached to cover 12 at the level of the joint between the outside edge and the central section.

Figure 3:
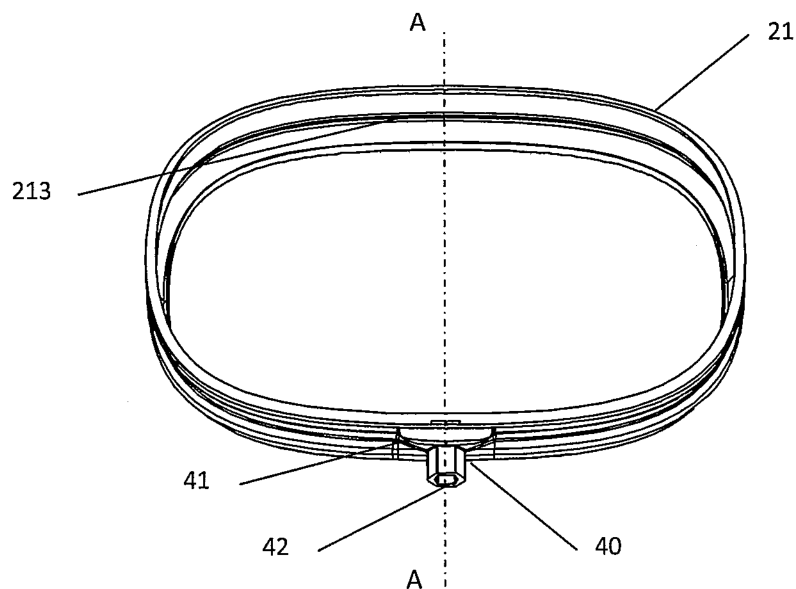
FIG. 3 is a side view of the cover hinge of the cooking appliance.
Figure 4:
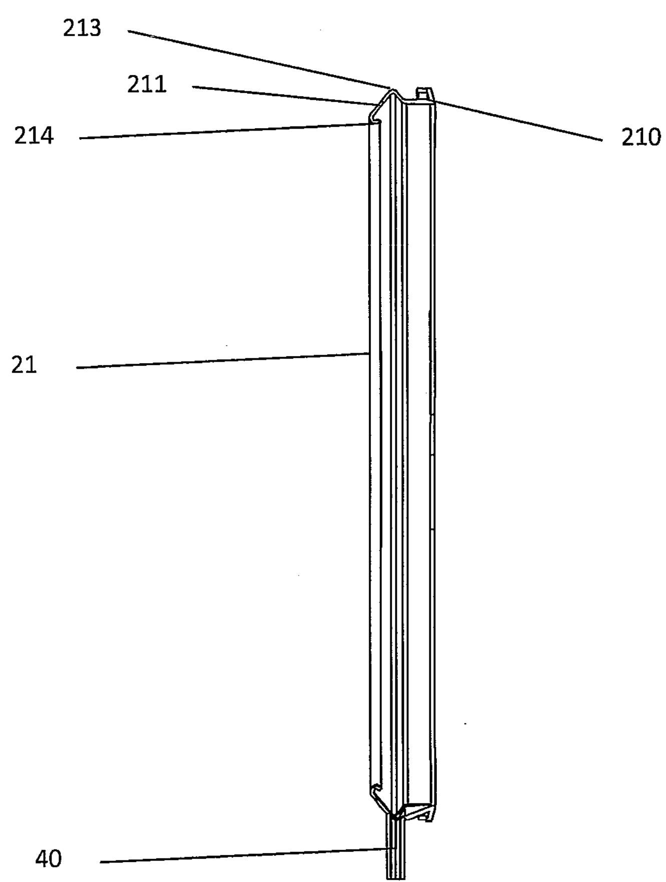
FIG. 4 is a AA section cut of the joint shown in FIG. 3.

Joint 21 will be described herein in detail using FIGS. 3 and 4. In accordance with the invention, the transverse section of joint 21 forms a spout (213). Spout 213 allows the condensate accumulated on central section 22 of cover 12 to be recovered when it is raised. For example, the general shape of the transverse section of joint 21 is a "V". When the cover is lowered, the lower segment (211) of the V rests on upper edge of case 10 to ensure watertightness. The upper section of the V includes an attachment mechanism (210) on cover 12. This attachment mechanism consists of an edge (210) in the form of a clasp which connects to a corresponding notch on the cover.

Joint 21 includes also a channel (40). One extremity (41) of channel 40 ends at spout 213. The second extremity (42) of the channel allows the condensate to be evacuated to reservoir 30. To do so, when cover 12 is raised, the second extremity ends near reservoir 30 and, more specifically, near its upper opening. In fact, channel 40 is preferably located near the lowest joint and near the reservoir when cover 12 is raised.

The lower section of joint 21 includes a rim (214) which forms a channel. Rim 214 allows the condensate from cover 12 to be retained when it is lowered. In addition, when the cover is raised, rim 214 prevents the condensate located on the upper portion of cover 12 from falling into the internal vat. Rather, the condensate is directed to spout 213 and then to channel 40.

The first extremity (41) of channel 40 may be flared to help direct the condensate to channel 40. Channel 40 is basically tubular. In addition, joint 21 and channel 40 may be made as a single piece, for example, from plastic. However, it is possible to construct channel 40 separately. The joint then includes an opening at the bottom of the spout to connect the spout and the channel. The channel and the joint may be connected by a collar, interlocking or any other means.

The appliance also includes a closing mechanism (50) of channel 40 when the cover is lowered. It is preferable that, when the cover is closed, vapor not escape through channel 40, but only through openings 23 of cover 12 designed for that purpose.

The closing mechanism may consist, for example, of at least one rib 50 on case 10 and/or on cover 12. The rib(s) 50 are placed above or below channel 40 when cover 12 is lowered. When the cover is lowered, ribs 50 put pressure on channel 40. This prevents the vapor and any condensate from escaping the appliance when cover 12 is lowered. The height of ribs 50 is, therefore, calculated so that the distance between the top of rib 50 and the cover or case 10 is less than the inside diameter of channel 40.

If a rib 50 is included both on the cover and the case, the distance between the two ribs should be less than the inside diameter of channel 40 and the two ribs should face one another when cover 12 is lowered.

In another variation, the closing mechanism consists of a tongue which closes off second extremity 42 of channel 40 when the cover is shut.

When cooking food in the cooking appliance in accordance with the invention, vapor may condense on central section 22 of cover 12. The condensate is initially collected in channel 214 formed at the free extremity of lower section 211 of joint 21. When the user opens cover 12, gravity causes the condensate to flow along central section 22 of cover 12 to spout 213 of joint 21. Similarly, the condensate collected in channel 214 flows to spout 213 into first extremity 41 of channel 40 due to gravity.

The channel is located in the lower section of joint 21 and, when the cover 12 is raised, ribs 50 do not prevent condensate flow in channel 40. Therefore, the condensate is evacuated to reservoir 30 through channel 40. This takes place very quickly (less than one second) and does not require action by the user.

Therefore, the invention prevents condensate from falling back on the food and does not require the user to take precautions when raising the cover to prevent the condensate from flowing onto the food or the working surface.

The invention claimed is:

1. An electrical cooking appliance comprising:

a case forming a cooking container with a vat that is closed by a pivoting cover mounted on the case; the pivoting cover includes a joint attached to an outer surface of the pivoting cover, and the joint at a transverse section forming a spout designed so that the joint includes a channel with a first extremity and a second extremity, wherein the first extremity opens into the spout, and the second extremity is located at a condensate reservoir when the pivoting cover is raised, and a lower section of the joint includes a rim which forms the channel, and the rim allows for condensate from the pivoting cover to be retained when the pivoting cover is lowered; and closing mechanisms to close the channel when the pivoting cover is lowered, wherein the closing mechanisms consist of at least one rib on the case or on the pivoting cover at the channel and the height of the ribs is designed so that, when the pivoting cover is lowered, the distance between the ribs and the case or the pivoting cover is less than the inside diameter of the channel.

2. A cooking appliance in accordance with claim 1, wherein the condensate reservoir is removably mounted on the case.

3. A cooking appliance in accordance with claim 1, wherein the joint and the channel form a single part.

4. A cooking appliance in accordance with claim 1, wherein the channel is located at a hinge of the cover.

5. A cooking appliance in accordance with claim 1, wherein the first extremity of the channel has a flared section.

6. A cooking appliance in accordance with claim 1, wherein a section transverse of the joint is V-shaped.

7. A cooking appliance in accordance with claim 1, wherein the appliance is a slow cooker.

* * * * *